United States Patent [19]

Froumajou

[11] 4,249,753
[45] Feb. 10, 1981

[54] FRONT SET OF WHEELS FOR AN AUTOMOBILE VEHICLE

[75] Inventor: Armand Froumajou, Osny, France

[73] Assignees: Automobiles Peugeot; Societe Anonyme Automobiles Citroen, both of France

[21] Appl. No.: 18,138

[22] Filed: Mar. 7, 1979

[30] Foreign Application Priority Data

Apr. 18, 1978 [FR] France ............................... 78 11299

[51] Int. Cl.³ .............................................. B60G 7/02
[52] U.S. Cl. .................................. 280/673; 280/660; 280/691
[58] Field of Search ...................... 280/690, 691, 96.1, 280/660, 665, 668, 673, 675

[56] References Cited

U.S. PATENT DOCUMENTS

| 2,660,449 | 11/1953 | MacPherson | 280/668 |
| 3,237,962 | 3/1966 | Kraus et al. | 280/673 |
| 3,819,202 | 6/1974 | Castor | 280/668 |
| 4,042,259 | 8/1977 | Fiedler et al. | 280/668 |

FOREIGN PATENT DOCUMENTS 1009498 5/1957 Fed. Rep. of Germany ........... 280/673
1216871 4/1960 France ..................................... 280/673

Primary Examiner—John J. Love
Assistant Examiner—Ross Weaver
Attorney, Agent, or Firm—Burns, Doane, Swecker & Mathis

[57] ABSTRACT

The invention provides a simpler and cheaper arrangement of the support for the lower guide means of each wheel in a front set of wheels having independently suspended wheels. This is achieved by providing a cross-member which is fixed under the side-frames of the vehicle and ties which are fixed to the side-frames and are supported by the cross-member. End portions of the ties extend beyond the cross-member and act as a journal for pivotally mounting the ends of the transverse guide arms.

Application in particular in MacPherson type suspensions.

4 Claims, 2 Drawing Figures

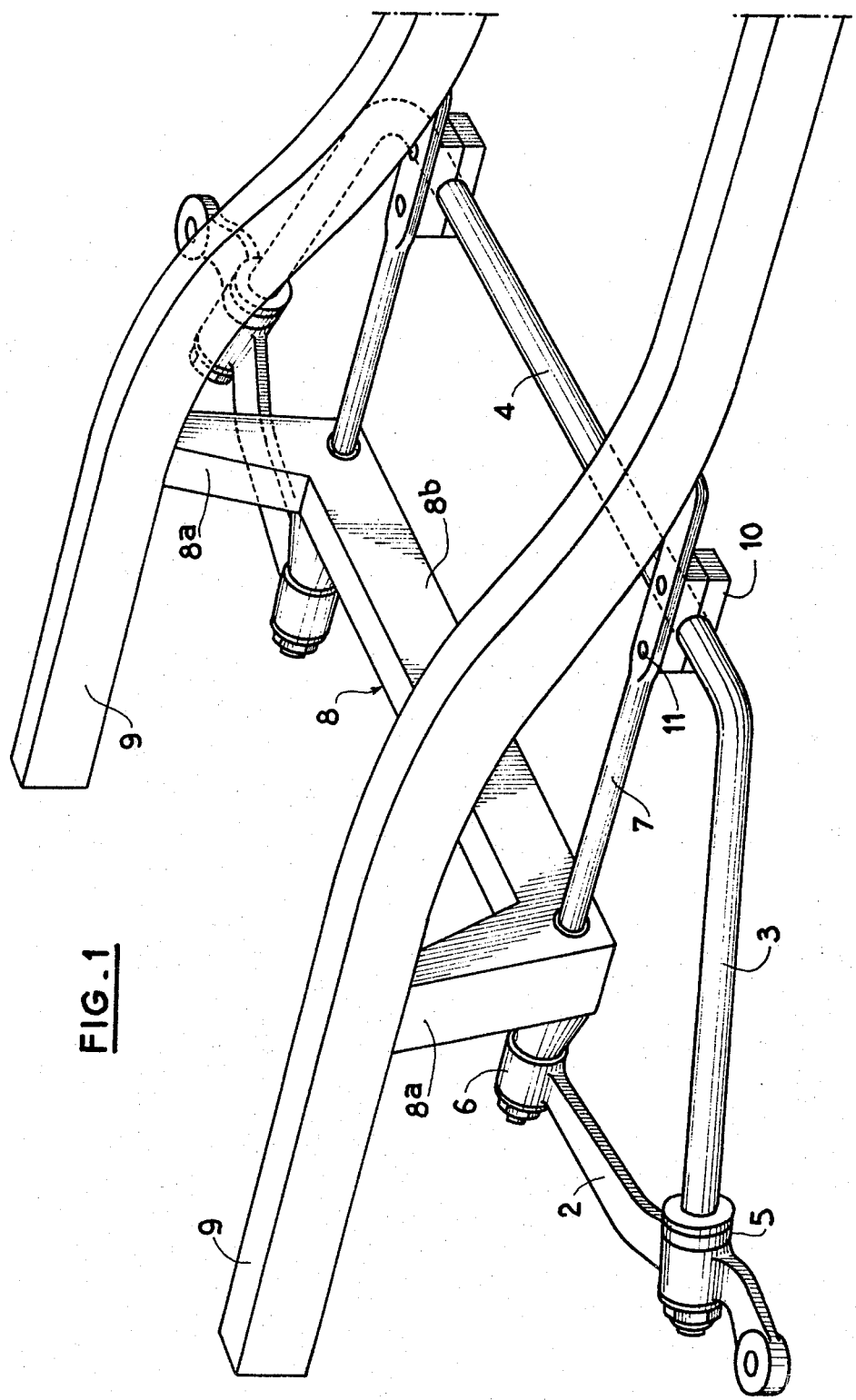

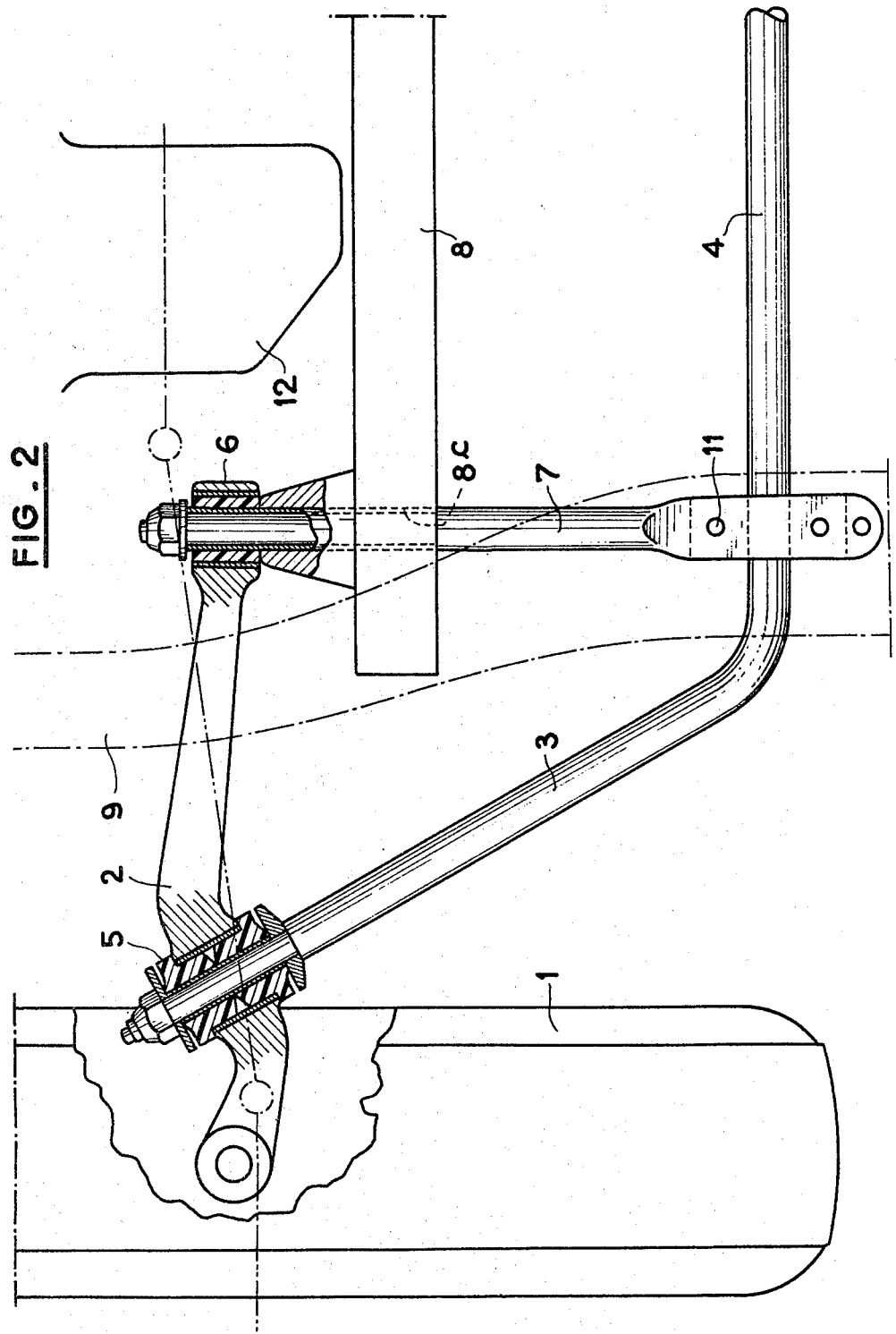

FRONT SET OF WHEELS FOR AN AUTOMOBILE VEHICLE

DESCRIPTION

The present invention relates to arrangements of front sets of wheels for automobile vehicles.

It concerns more particularly a front set of wheels the wheels of which are suspended independently and which comprises lower guide means formed by a transverse arm and an oblique arm. It is more particularly applicable to suspensions known by the name of MacPherson.

It is known that on a front wheel drive vehicle, in particular when the engine is disposed transversely, the side frames must be raised in the region of the front set of wheels to leave a space for the transmission means. This results in the use of a cradle under the side-frames for holding the suspension members. Such a cradle is heavy and expensive and the object of the present invention is to provide an arrangement for mounting the suspension members by simpler means with an appreciable reduction in weight and cost.

According to the invention there is provided a front set of wheels for an automobile vehicle comprising two side-frames which are part of the structure of the vehicle and lower guide means for each wheel which comprise, for each wheel, a transverse arm mounted to be pivotal about a longitudinal axis and an oblique arm, wherein there are provided a support for the lower guide means of the wheels comprising a U-shaped cross-member contained in a substantially vertical plane and fixed under the side-frames and two ties connecting the cross-member to the structrue of the vehicle, each tie being extended beyond the cross-member in the form of a journal constituting the articulation of the corresponding transverse arm.

An embodiment of the invention will be described in the ensuing description with reference to the accompanying drawings in which:

FIG. 1 is a perspective view of the essential parts of the set of wheels according to the invention, and FIG. 2 is a plan view of one half of the set of wheels.

The figures show a part of a front set of wheels comprising two wheels 1 (one of which is seen in FIG. 2) whose lower guide means comprise, for each wheel, a transverse arm 2 and an oblique arm 3. The latter constitutes a section of a transverse stabilizer 4 including a torsion bar. The arms 2 and 3 are interconnected by an articulation 5.

The end of the arm 2 opposed to the wheel 1 is carried by an articulation 6 on an end portion of a bar 7. The latter is carried by a U-shaped cross-member 8 fixed under the side-frames 9 which are part of the structure of the vehicle. The cross-member 8 is so disposed that the branches of the U are contained in a vertical or substantially vertical plane, the ends of the branches 8a being secured to a vertically offset portion 9a adjacent the front end of the side-frames 9, while the bar 7 extends through an aperature 8c which is roughly in the region of the junctions between the branches 8a and the web portion of 8b of the cross-member. The bar 7 moreover extends, on the side of the cross-member 8 opposed to the articulation 6, to the side-frame 9 to which it is rigidly fixed, for example by welding 7a or the like, so as to constitute a tie maintaining the cross-member 8.

The stabilizer bar 4 is carried by bearings 10 which are fixed by bolts 11 under each of the tie bars 7.

The set of wheels arranged in this way is completed by conventional means (not shown) and has in particular the following advantages:

it is particularly light and yet strong;

the cantilever disposition of the articulation 6 enables the arm 2 to be maintained in a roughly transverse plane, which is desirable in order to obtain a good guiding of the wheel, while the cross-member 8 is offset rearwardly to allow space for transmission means such as the differential 12.

In a modification of the invention, the tie bars 7 may be secured to the side-frame 9 by the bolts 11 which maintain the bearings 10 of the stabilizer bar 4.

Having now described my invention what I claim as new and desire to secure by Letters Patent is:

1. In a vehicle comprising two side-frames which are part of the structure of the vehicle, and a front suspension comprising a set of front wheels and lower guide means for each front wheel, which guide means comprise for each wheel a transverse arm and an oblique arm interconnected by an articulation; the improvement wherein the side-frames each have an upwardly offset front portion and the lower guide means are supported by a support comprising a U-shaped cross-member which has a web portion and two branches upwardly extending from the web portion and is contained in a substantially vertical transverse plane spaced rearwardly from the transverse arms and from a vertical plane containing the axes or rotation of the front wheels and is disposed under said offset portions of the side-frames and fixed to the side-frames adjacent upper ends of said branches, two ties respectively connecting the cross-member to the side-frames, each tie extending rearwardly of the vehicle from the cross-member to a rear end portion of the tie and extending forwardly of the vehicle through and beyond the cross-member by a front end portion of the tie which forms a journal, on which journal the corresponding transverse arm is mounted to pivot about a substantially longitudinal axis, means mounting an end of the oblique arm remote from said articulation the corresponding side-frame to form a pivot longitudinally closely adjacent said rear end portion of the tie, and means fixing the rear end portion of each tie to the corresponding side-frame whereby each tie, said offset portion of the corresponding side-frame and the corresponding branch of the U-shaped cross-member form a rigid structure.

2. A vehicle in claim 1, wherein each tie comprises a bar which extends through an aperture in the U-shaped cross-member.

3. A vehicle as claimed in claim 1, wherein said means mounting the end of each oblique arm is a bearing fixed on the corresponding tie.

4. In a vehicle comprising two side-frames which are part of the structure of the vehicle, and a front suspension comprising a set of front wheels and lower guide means for each front wheel, which guide means comprise for each wheel a transverse arm and an oblique arm interconnected by an articulation; the improvement wherein the side-frames each have an upwardly offset front portion and the lower guide means are supported by a support comprising a U-shaped cross-member which has a web portion and two branches upwardly extending from the web portion and is contained in a substantially vertical transverse plane spaced rearwardly from the transverse arms and from a vertical plane containing the axes of rotation of the front wheels and is disposed under said offset portions of the side-frames and fixed to the side-frames adjacent upper ends of said branches, two ties respectively connecting the cross-member to the side-frames, each tie extending rearwardly of the vehicle from the cross-member to a rear end portion of the tie and extending forwardly of the vehicle through and beyond the cross-member by a front end portion of the tie which forms a journal, on which journal the corresponding transverse arm is mounted to pivot about a substantially longitudinal axis, said two oblique arms forming integral end portions of a transverse torsion bar, which end portions extend obliquely rearwardly from said articulations, means mounting the torsion bar on the side-frames to rotate about an axis adjacent said rear end portions of the ties, and means fixing the rear end portion of each tie to the corresponding side-frame whereby each tie, said offset portion of the corresponding side-frame and the corresponding branch of the U-shaped cross-member form a rigid structure.

* * * * *